(12) United States Patent
Nanri et al.

(10) Patent No.: US 10,766,492 B2
(45) Date of Patent: Sep. 8, 2020

(54) DRIVING ASSISTANCE METHOD AND DRIVING ASSISTANCE DEVICE

(71) Applicant: Nissan Motor Co., Ltd., Yokohama-shi, Kanagawa (JP)

(72) Inventors: Takuya Nanri, Kanagawa (JP); Fang Fang, Kanagawa (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 0 days.

(21) Appl. No.: 16/489,924

(22) PCT Filed: Mar. 2, 2017

(86) PCT No.: PCT/JP2017/008310
§ 371 (c)(1),
(2) Date: Aug. 29, 2019

(87) PCT Pub. No.: WO2018/158911
PCT Pub. Date: Sep. 7, 2018

(65) Prior Publication Data
US 2019/0389464 A1    Dec. 26, 2019

(51) Int. Cl.
*B60W 30/18*   (2012.01)
*B60W 40/10*   (2012.01)

(52) U.S. Cl.
CPC .......... *B60W 30/18* (2013.01); *B60W 40/10* (2013.01); *B60W 2554/801* (2020.02); *B60W 2554/804* (2020.02)

(58) Field of Classification Search
None
See application file for complete search history.

(56) References Cited

U.S. PATENT DOCUMENTS

| | | | |
|---|---|---|---|
| 8,874,267 B1* | 10/2014 | Dolgov ............... | G01C 21/26 700/255 |
| 9,495,874 B1* | 11/2016 | Zhu .................... | G08G 1/165 |
| 9,690,296 B1* | 6/2017 | Dolgov ................ | B60W 30/08 |
| 9,975,483 B1* | 5/2018 | Ramaswamy ........ | B60W 40/08 |
| 9,987,984 B2* | 6/2018 | Goudy ................. | B60Q 9/008 |
| 10,488,506 B2* | 11/2019 | Takehara ............. | G01S 7/006 |

FOREIGN PATENT DOCUMENTS

| | | |
|---|---|---|
| DE | 102015208530 A1 | 11/2016 |
| JP | H1079100 A | 3/1998 |
| JP | 200287188 A | 3/2002 |
| JP | 2008155882 A | 7/2008 |
| JP | 2009116790 A | 5/2009 |
| JP | 2012-192878 A | 10/2012 |
| WO | 2016/104198 A1 | 6/2016 |

\* cited by examiner

*Primary Examiner* — Richard M Camby
(74) *Attorney, Agent, or Firm* — Young Basile Hanlon & MacFarlane, P.C.

(57) ABSTRACT

A driving assistance method detects a behavior of a moving object causing a blind spot area around a host vehicle, predicts a probability of action that the moving object takes when an obstacle is present in the blind spot area, according to a road structure around the host vehicle, and compares the behavior of the moving object with the probability of action that the moving object takes, so as to predict an action of the moving object.

12 Claims, 8 Drawing Sheets

DRIVING ASSISTANCE METHOD AND DRIVING ASSISTANCE DEVICE

TECHNICAL FIELD

The present invention relates to a driving assistance method and a driving assistance device.

BACKGROUND

A vehicle control device is known that controls a vehicle depending on the corresponding conditions when the vehicle is traveling under the presence of a blind spot (refer to WO 2016/104198). The vehicle control device disclosed in Patent Document 1 detects an area of a blind spot from the vehicle, determines the relative priority between a route that a moving object which may appear from the blind spot area is following, and a route that the vehicle is following, and outputs a signal for controlling the vehicle in accordance with the determined priority.

SUMMARY

While the vehicle control device disclosed in WO 2016/104198 can predict the presence of an object appearing from the blind spot area, the vehicle control device cannot predict that a moving object, which can be the cause of a blind spot area, would move in association with the movement of the object present in the blind spot area. The vehicle control device thus needs to immediately change the behavior of the vehicle if the moving object causing the blind spot area suddenly changes its behavior, leading the occupant to feel uncomfortable.

To solve the conventional problems described above, the present invention provides a driving assistance method and a driving assistance device capable of avoiding a sudden change in behavior of a host vehicle so as to reduce the occupant's discomfort.

A driving assistance method and a driving assistance device according to an aspect of the present invention detects behavior of a moving object causing a blind spot area around a host vehicle, predicts a probability of action that the moving object takes when an obstacle which cannot be detected by the host vehicle is present in the blind spot area, according to a road structure around the host vehicle, and compares the behavior with the probability of action so as to predict the action of the moving object.

The aspect of the present invention can provide the driving assistance method and the driving assistance device capable of avoiding a sudden change in behavior of the host vehicle so as to reduce the occupant's discomfort.

DETAILED DESCRIPTION

Hereinafter, an embodiment will be described with reference to the drawings.

Figure 4A:
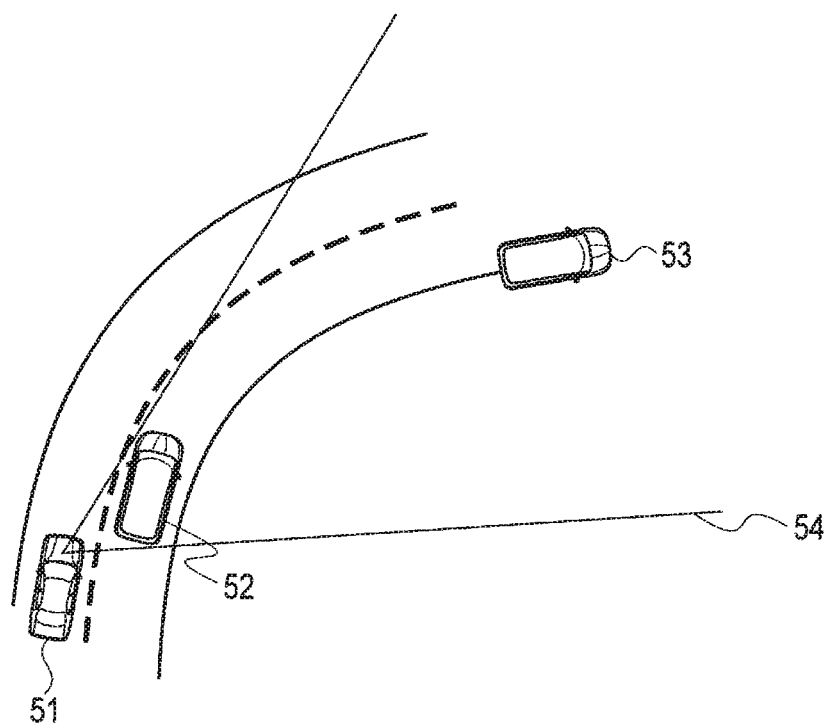
FIG. 4A is a plan view illustrating a traveling situation in which a host vehicle 51 is traveling parallel to another vehicle (a parallel-traveling vehicle 52) on a right-curved two-lane road.
Figure 4B:
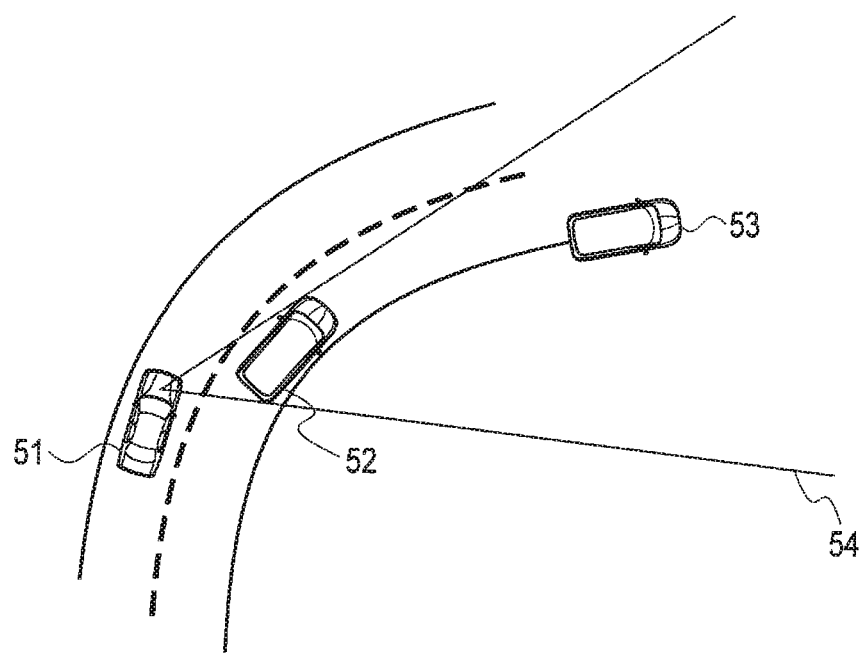
FIG. 4B is a plan view illustrating a state after a predetermined lapse of time from the situation illustrated in FIG. 4A.

A driving assistance device according to the embodiment is effective for use in a traveling situation as illustrated in FIG. 4A and FIG. 4B, for example. FIG. 4A and FIG. 4B each illustrate the traveling situation in which a host vehicle 51 is traveling in the left lane on a right-curved two-lane road, another vehicle 52 (an example of a moving object) is traveling alongside on the right lane obliquely ahead of the host vehicle 51, and a parked vehicle 53 (an example of an object) is present ahead on the right lane. The other vehicle 52 (hereinafter referred to as a "parallel-traveling vehicle") is presumed to move toward the left from the middle in the width direction in the right lane to avoid a collision with the parked vehicle 53, namely, presumed to take an avoiding action.

This traveling situation causes a blind spot area 54 in which the parked vehicle 53 is present on the road, ahead of the host vehicle 51 because of the parallel-traveling vehicle 52. While the parallel-traveling vehicle 52 is aware of the parked vehicle 53, the host vehicle 51 fails to recognize the presence of the parked vehicle 53, which hinders an object detection sensor mounted on the host vehicle 51 from detecting the parked vehicle 53. The host vehicle 51 thus cannot predict that the parallel-traveling vehicle 52 would take the action of avoiding the parked vehicle 53 present in the blind spot area 54. The host vehicle 51 would then need to immediately change its behavior if the parallel-traveling vehicle 52 suddenly changes its behavior to take the avoiding action, leading the occupant to feel uncomfortable.

The driving assistance device according to the embodiment assists the host vehicle 51 in traveling in view of the blind spot area 54 in the situation in which the parallel-traveling vehicle 52 (an example of the moving object) traveling around the host vehicle 51 causes the blind spot area 54. In particular, the driving assistance device predicts an action of the parallel-traveling vehicle 52 causing the blind spot area 54 on the assumption that there is any other object (such as the parked vehicle 53 or a pedestrian) in the blind spot area 54, and controls the speed and the steering angle of the host vehicle in accordance with the predicted action of the parallel-traveling vehicle 52.

Figure 1:
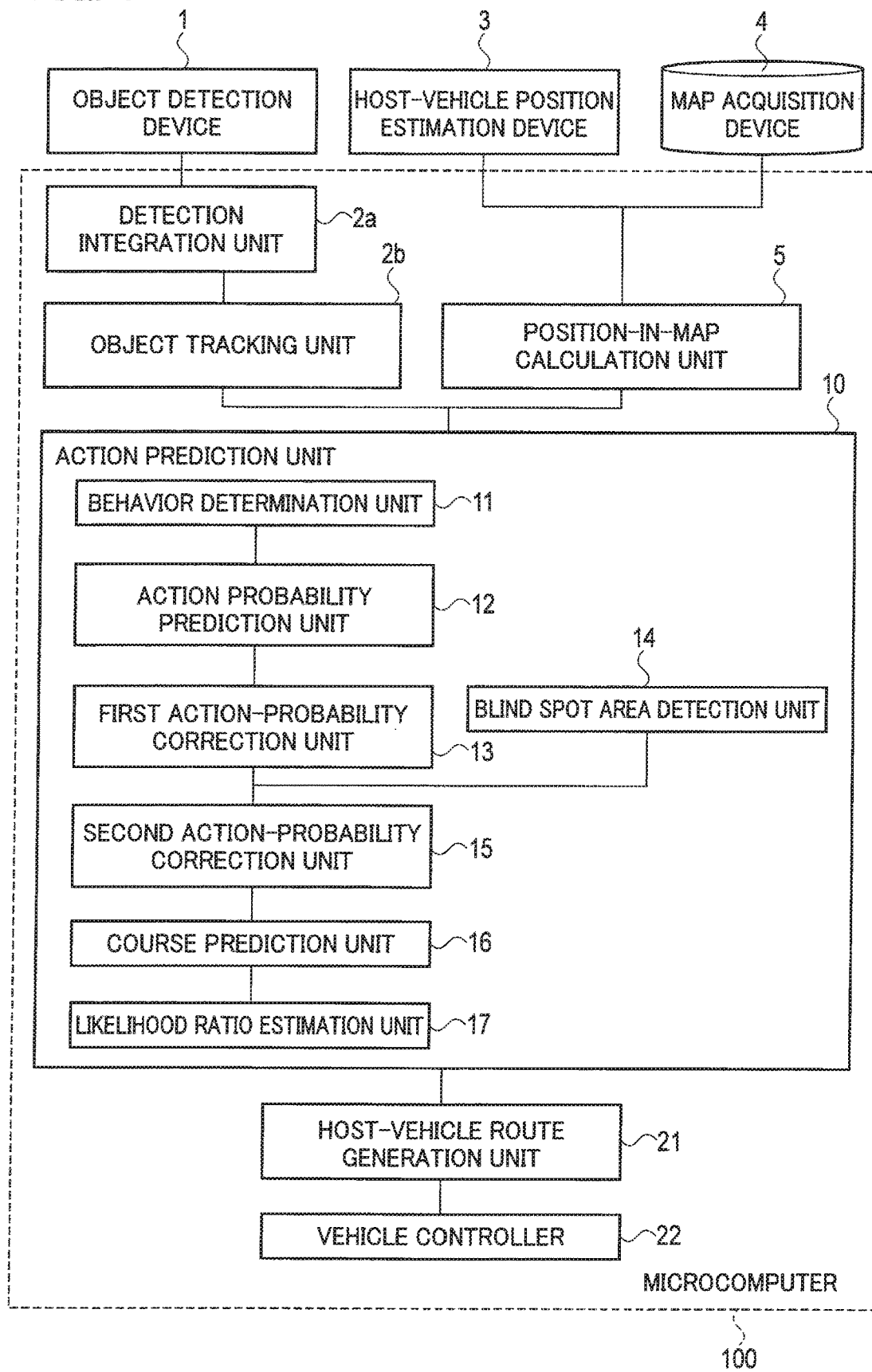
FIG. 1 is a block diagram showing a configuration of a driving assistance device according to an embodiment.

The configuration of the driving assistance device according to the embodiment is described below with reference to FIG. 1. The driving assistance device includes an object detection device 1, a host-vehicle position estimation device 3, a map acquisition device 4, and a microcomputer 100.

The object detection device 1 includes various kinds of object detection sensors mounted on the host vehicle 51, such as a laser radar, a millimeter-wave radar, and a camera, for detecting objects around the host vehicle 51. The object detection device 1 detects objects around the host vehicle 51 using the plural object detection sensors. The object detection device 1 detects a moving object such as another vehicle, a motorcycle, a bicycle, and a pedestrian, and a stationary object such as a parked vehicle. For example, the object detection device 1 detects a position, an attitude, a size, a velocity, acceleration, deceleration, and a yaw rate of a moving object or a stationary object on the basis of the host vehicle. As used herein, a position, an attitude (a yaw angle), a size, a velocity, acceleration, deceleration, and a yaw rate of an object are collectively referred to as "behavior" of the object. The object detection device 1 outputs, as detection results, the behavior of a two-dimensional object in the zenithal view as viewed from the air above the host vehicle 51, for example.

The host-vehicle position estimation device 3 includes a position detection sensor, such as a global positioning system (GPS) or odometry, for measuring an absolute position of the host vehicle 51. The host-vehicle position estimation device 3 measures the absolute position of the host vehicle 51, which is a position based on a predetermined reference point, the attitude, and the velocity of the host vehicle 51 by use of the position detection sensor.

The map acquisition device 4 acquires map information indicating a structure of a road on which the host vehicle 51 is traveling. The map information acquisition device 4 may hold map database storing the map information, or may acquire the map information from an external map data server through cloud computing. The map information acquired by the map acquisition device 4 includes various pieces of information on the road structure, such as absolute positions of lanes, and a connectional relation and a relative positional relation of lanes.

The microcomputer 100 (an example of a controller) predicts an action of another vehicle in accordance with the detection results obtained by the object detection device 1 and the host-vehicle position estimation device 3 and the information acquired by the map acquisition device 4, generates a route of the host vehicle 51 based on the action of the other vehicle, and controls the host vehicle 51 in accordance with the generated route.

The microcomputer 100 is a general-purpose microcomputer including a central processing unit (CPU), a memory, and an input-output unit. A computer program (a driving assistance program) is installed on the microcomputer 100 so as to function as the driving assistance device. The microcomputer 100 functions as a plurality of information processing circuits (2a, 2b, 5, 10, 21, and 22) included in the driving assistance device when the computer program is executed. While the embodiment is illustrated with the case in which the software is installed to fabricate the information processing circuits (2a, 2b, 5, 10, 21, and 22), dedicated hardware for executing each information processing as described below can be prepared to compose the information processing circuits (2a, 2b, 5, 10, 21, and 22). The respective information processing circuits (2a, 2b, 5, 10, 21, and 22) may be composed of individual hardware. The information processing circuits (2a, 2b, 5, 10, 21, and 22) may also serve as an electronic control unit (ECU) used for other control processing with respect to the vehicle.

The microcomputer 100 includes, as the information processing circuits (2a, 2b, 5, 10, 21, and 22), a detection integration unit 2a, an object tracking unit 2b, a position-in-map calculation unit 5, an action prediction unit 10, a host-vehicle route generation unit 21, and a vehicle controller 22. The action prediction unit 10 includes a behavior determination unit 11, an action probability prediction unit 12, a first action-probability correction unit 13, a blind spot area detection unit 14, a second action-probability correction unit 15, a course prediction unit 16, and a likelihood ratio estimation unit 17.

The detection integration unit 2a integrates several detection results obtained by the respective object detection sensors included in the object detection unit 1 to output a single detection result per object. In particular, the detection integration unit 2a computes the behavior of an object, which is the most reasonable and has the least error among pieces of the behavior of the object detected by the respective object detection sensors, in view of error characteristics of the respective object detection sensors. The detection integration unit 2a collectively evaluates the detection results obtained by the various sensors so as to obtain a more accurate detection result for each object by a conventional sensor fusion method.

The object tracking unit 2b tracks each object detected by the object detection device 1. In particular, the object tracking unit 2b determines the sameness of the object (mapping) detected at intervals in accordance with the behavior of the object output at different times, by use of the detection result integrated by the detection integration unit 2a, and predicts the behavior of the object in accordance with the mapping result. Each piece of the behavior of the object output at different times is stored in the memory in the microcomputer 100, and is used for course prediction described below.

The position-in-map calculation unit 5 estimates the position and the attitude of the host vehicle 51 on the map according to the absolute position of the host vehicle 51 acquired by the host-vehicle position estimation device 3 and the map data acquired by the map acquisition device 4. For example, the position-in-map calculation unit 5 specifies both the road and the lane of the road on which the host vehicle 51 is traveling.

The action prediction unit 10 predicts the action of the moving object around the host vehicle 51 in accordance with the detection result obtained by the detection integration unit 2a and the position of the host vehicle 51 specified by the position-in-map calculation unit 5. The specific configuration of the action prediction unit 10 is described in detail below.

The behavior determination unit 11 specifies the behavior of the object on the map in accordance with the position of the host vehicle 51 on the map and the behavior of the object acquired by the detection integration unit 2a. The behavior determination unit 11 determines that the object is a moving object when the position of the object on the map changes with the passage of time, and determines the attribute of the moving object (a vehicle or a pedestrian, for example) in accordance with the size and the velocity of the moving object. When the moving object is determined to be another traveling vehicle, the behavior determination unit 11 specifies the road and the lane on which the other vehicle is traveling.

When the position of the object on the map does not change with the passage of time, the behavior determination unit 11 determines that the object is a stationary object, and determines the attribute of the stationary object (a parked vehicle or a pedestrian, for example) in accordance with the position on the map, the attitude, and the size of the stationary object.

The action probability prediction unit 12 predicts a probability of action of the other vehicle based on the map. The action probability prediction unit 12 predicts the intention of action that the other vehicle would take next, based on the road structure included in the map information and the information of the lane to which the other vehicle belongs, and calculates a primary course of the other vehicle in accordance with the predicted intention of action based on the road structure. As used herein, the term "probability of action" refers to a superordinate concept including the intention of action and the primary course. The term "primary course" encompasses profiles of positions of the other vehicle at different times and also profiles of velocities of the other vehicle at the respective positions.

For example, when the other vehicle is traveling on a single curved road with a single lane, the action probability prediction unit 12 predicts the intention of action (forward movement) of following the lane, and calculates a course along the lane on the map as the primary course. When the other vehicle is traveling on a single curved road with a plurality of lanes, the action probability prediction unit 12 predicts the intention of action (lane change) of changing the lane to the right or the left. The primary course of the other vehicle with the intention of action upon the lane change is a course of changing lanes based on the road structure and a predetermined period of lane-change time. When the other vehicle is traveling toward an intersection, the action probability prediction unit 12 predicts the intention of action including a forward movement, a right turn, and a left turn, and calculates a forward-movement course, a right-turn course, and a left-turn course as the primary course based on the road structure at the intersection on the map. The calculation of the "primary course" takes the road structure into consideration, but does not take account of the behavior of the other vehicle integrated by the detection integration unit 2a.

Figure 5:
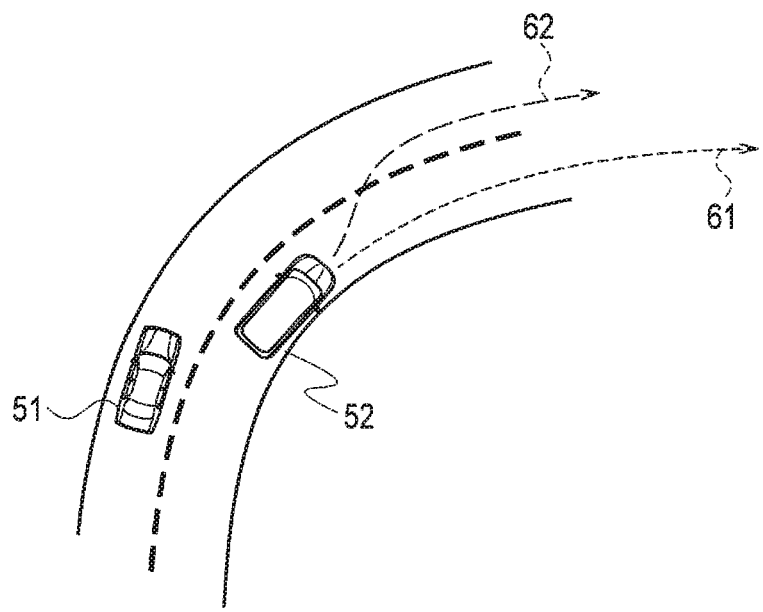
FIG. 5 is a plan view illustrating a forward-movement course 61 and a lane-change course 62 as examples of primary courses in the traveling situation in which the host vehicle 51 and the parallel-traveling vehicle 52 are traveling parallel to each other on the right-curved two-lane road.

FIG. 5 illustrates a two-lane curved road, as in the case of FIG. 4A and FIG. 4B. The parallel-traveling vehicle 52 is traveling in the right lane on the road. The action probability prediction unit 12 predicts both the intention of the action of continuing traveling in the right lane (forward movement) and the intention of the action of changing the lanes from the right to the left (lane change), based on the road structure and the position (the traveling lane) of the parallel-traveling vehicle 52 illustrated in FIG. 5. The action probability prediction unit 12 then calculates a forward-movement course 61 and a lane-change course 62 as illustrated in FIG. 5, based on the road structure of the curved road and a predetermined period of lane-change time. The action probability prediction unit 12 thus predicts the probability of action (the intention of action and the primary course) of the other vehicle 52 in accordance with the structure of the road on which the other vehicle 52 is traveling.

The first action-probability correction unit 13 takes account of a stationary object detected by the object detection device 1 to correct the probability of action predicted by the action probability prediction unit 12. In particular, the first action-probability correction unit 13 determines whether the primary course of the other vehicle and the position of the stationary object overlap with each other. When the primary course and the position overlap with each other, the first action-probability correction unit 13 further adds an intention of action and a primary course of the parallel-traveling vehicle 52 for avoiding the stationary object.

When another moving object (not shown) is detected by the object detection device 1 simultaneously with the parallel-traveling vehicle 52 illustrated in FIG. 5, the first action-probability correction unit 13 takes account of the other moving object to correct the probability of action predicted by the action probability prediction unit 12. In particular, the first action-probability correction unit 13 chronologically determines whether the other moving object and the parallel-traveling vehicle 52 overlap with each other. When the two moving objects overlap with each other, the first action-probability correction unit 13 further adds an intention of action and a primary course of the parallel-traveling vehicle 52 for avoiding the other moving object.

The blind spot area detection unit 14 detects a blind spot area of the host vehicle 51 caused by an object detected by the object detection device 1. The object detected by the object detection device 1 can cause the blind spot area around the host vehicle 51. The blind spot area detection unit 14 detects the blind spot area of the host vehicle 51 caused by the other vehicle (the parallel-traveling vehicle 52) among the objects detected by the object detection device 1. In particular, the blind spot area detection unit 14 determines that the blind spot area of the host vehicle 51 is caused by the other vehicle when the lane ahead of the other vehicle in the traveling direction disappears from the sight of the host vehicle 51 at a proportion of greater than or equal to a predetermined threshold, and such a state continues for a predetermined period of time. For example, when 50% of the area of the lane in the traveling direction of the other vehicle disappears from the sight of the host vehicle 51, and this state continues for 500 milliseconds, the blind spot area detection unit 14 detects the blind spot area and determines that the other vehicle is an object causing the blind spot area. The blind spot area is thus specified on the map. The threshold is not necessarily a constant value, and may vary depending on the place on the map or the circumferential conditions.

The second action-probability correction unit 15 takes account of the blind spot area to correct the probability of action predicted by the action probability prediction unit 12. In particular, the second action-probability correction unit 15 predicts the probability of action that the other vehicle would take when an obstacle is present in the blind spot area, and adds the predicted probability of action to the probability of action predicted by the action probability prediction unit 12. First, the second action-probability correction unit 15 presumes that there is an obstacle such as a vehicle parked on a street in the blind spot area, which requires the other vehicle to make a change in traveling. Subsequently, the second action-probability correction unit 15 predicts the intention of action that the other vehicle causing the blind spot area would take for avoiding the obstacle in the blind spot area on the above presumption, and calculates the primary course of the other vehicle in accordance with the intention of action based on the road structure.

Figure 6:
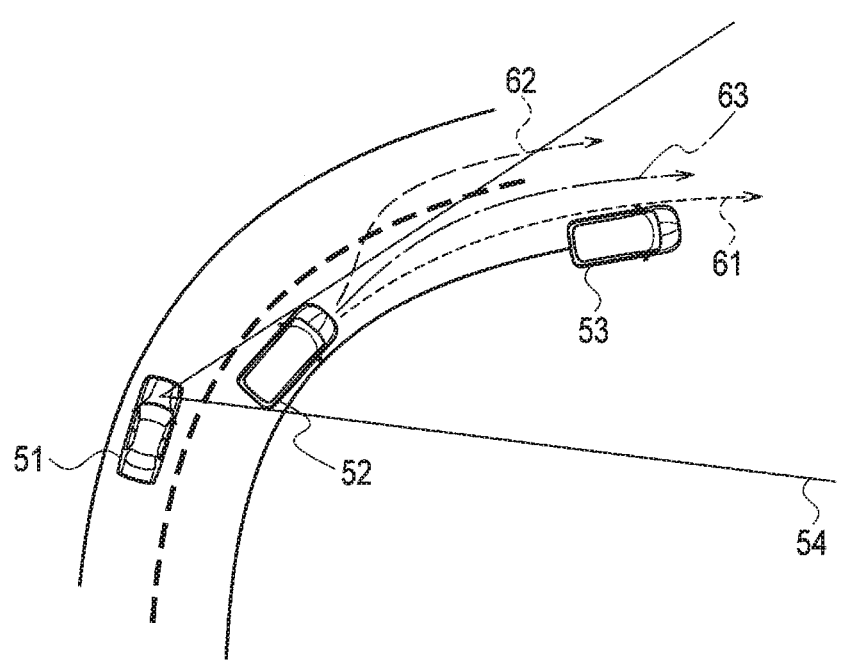
FIG. 6 is a plan view illustrating an obstacle-avoiding course 63 as another example of the primary courses in the same traveling situation as that illustrated in FIG. 5.

FIG. 6 illustrates an example in which the parallel-traveling vehicle 52 around the host vehicle 51 causing the blind spot area 54 of the host vehicle 51 is detected by the object detection device 1. The second action-probability correction unit 15 presumes that the parked vehicle 53 (an example of the obstacle) is present in the blind spot area 54. In particular, the host vehicle 51 is traveling parallel to the parallel-traveling vehicle 52 (an example of the moving object) traveling obliquely ahead of the host vehicle 51 in the right lane on the two-lane curved road, which causes the blind spot area 54 continuously in terms of time ahead of the parallel-traveling vehicle 52. In such a traveling situation, the second action-probability correction unit 15 presumes that the parked vehicle 53 is present ahead of the parallel-traveling vehicle 52 traveling in the right lane, for example. The second action-probability correction unit 15 then predicts the intention of action (obstacle avoidance) that the parallel-traveling vehicle 52 would take for avoiding overlapping with the parked vehicle 53 on the above presumption, and calculates the primary course (obstacle-avoiding course 63) based on the predicted intention of action (obstacle avoidance). This primary course (obstacle-avoiding course 63) is added to the primary courses (61 and 62) having been already calculated.

As described above, the action probability prediction unit 12 predicts the intention of action (forward movement or lane change) based on the structure of the road on which the parallel-traveling vehicle 52 is traveling so as to calculate the forward-movement course 61 or the lane-change course 62 as illustrated in FIG. 5. The second action-probability correction unit 15 further predicts the intention of action (obstacle avoidance) in view of the blind spot area so as to calculate the obstacle-avoiding course 63 illustrated in FIG. 6 based on the structure of the road.

The course prediction unit 16 predicts a course (effective course) that the other vehicle follows, in accordance with the behavior detected by the behavior determination unit 11. In particular, the course prediction unit 16 calculates the effective course when the other vehicle is presumed to take action based on the intention of action predicted, by a conventional state estimation method such as Kalman filtering. As used herein, the term "effective course" encompasses profiles of positions of the other vehicle at different times and also profiles of velocities of the other vehicle at the respective positions, as in the case of the primary course. The effective course and the primary course are common in that the other vehicle would follow, but differ from each other in that the effective course is calculated in view of the behavior of the other vehicle, while the primary course is calculated without consideration of the behavior of the other vehicle.

FIG. 6 illustrates the primary courses (61, 62, and 63) of the other vehicle 52 calculated according to the intention of action and the road structure while the behavior of the other vehicle 52 is not taken into consideration. Since the current attitude (yaw angle) of the other vehicle 52, for example, is not taken into consideration, the respective primary courses (61, 62, and 63) extend in different directions from the current position of the other vehicle 52. The course prediction unit 16 then takes account of the behavior of the other vehicle 52 to calculate the course (effective course) corresponding to the intention of action described above. Namely, the course prediction unit 16 calculates the effective course when the other vehicle 52 is presumed to take action corresponding to the intention of action described above.

An example of calculating the effective course of the parallel-traveling vehicle 52 in accordance with the attitude and the velocity (examples of the behavior) of the parallel-traveling vehicle 52 traveling in the right lane on the two-lane curved road is described below with reference to FIG. 7 to FIG. 9.

Figure 7:
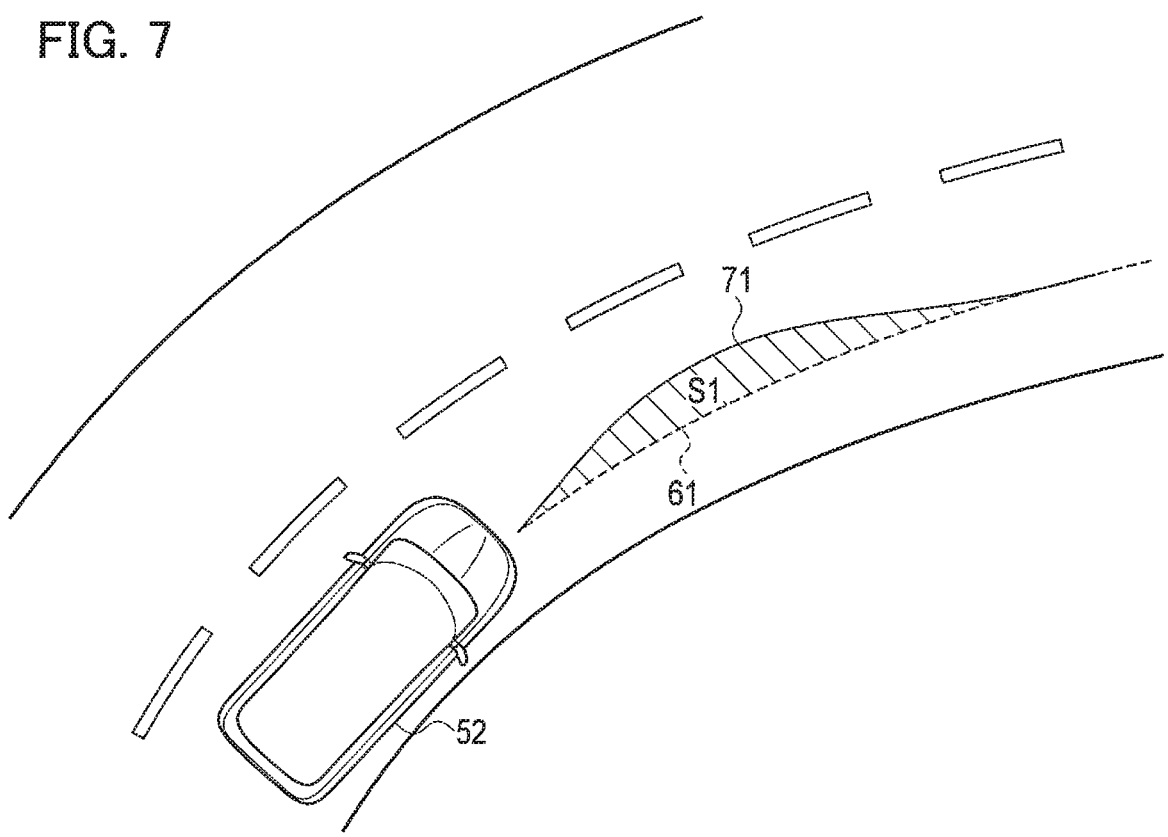
FIG. 7 is an enlarged plan view of a part in front of the parallel-traveling vehicle 52 shown in FIG. 6, showing a difference between the primary course (the forward-movement course 61) and an effective course 71.
Figure 8:
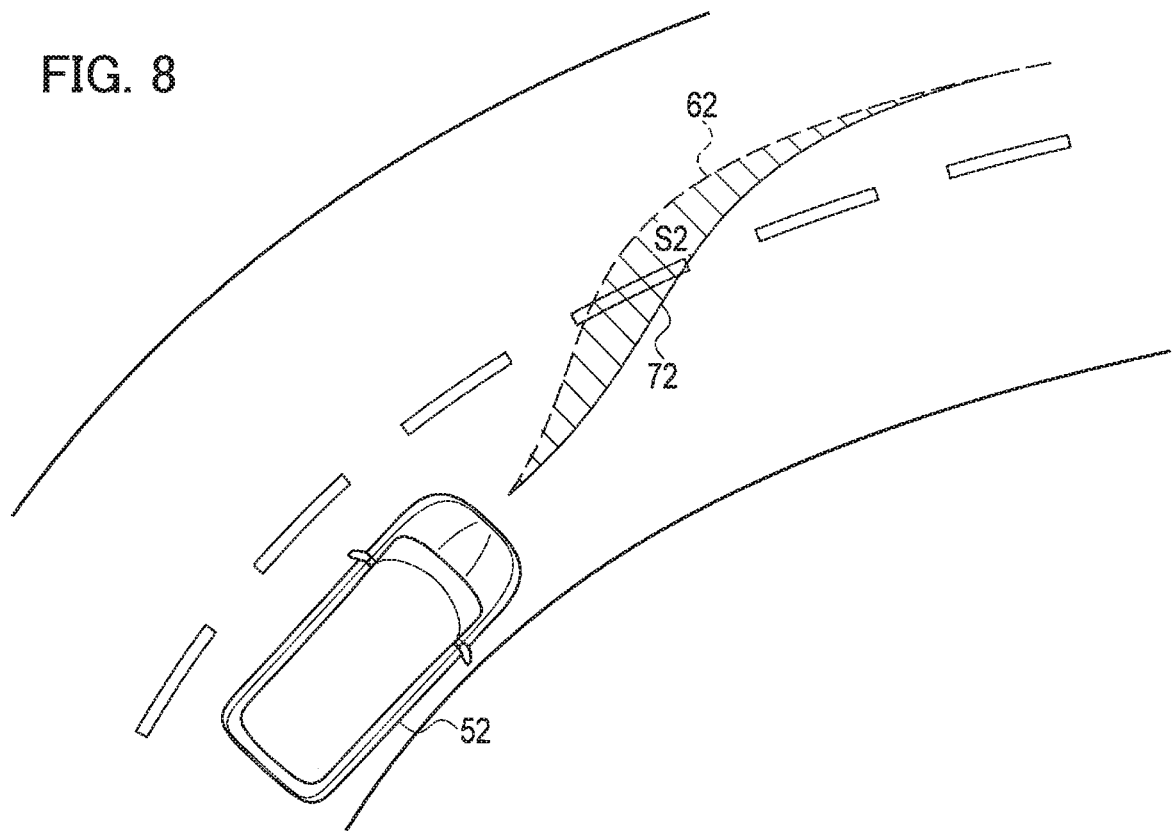
FIG. 8 is an enlarged plan view of a part in front of the parallel-traveling vehicle 52 shown in FIG. 6, showing a difference between the primary course (the lane-change course 62) and an effective course 72.
Figure 9:
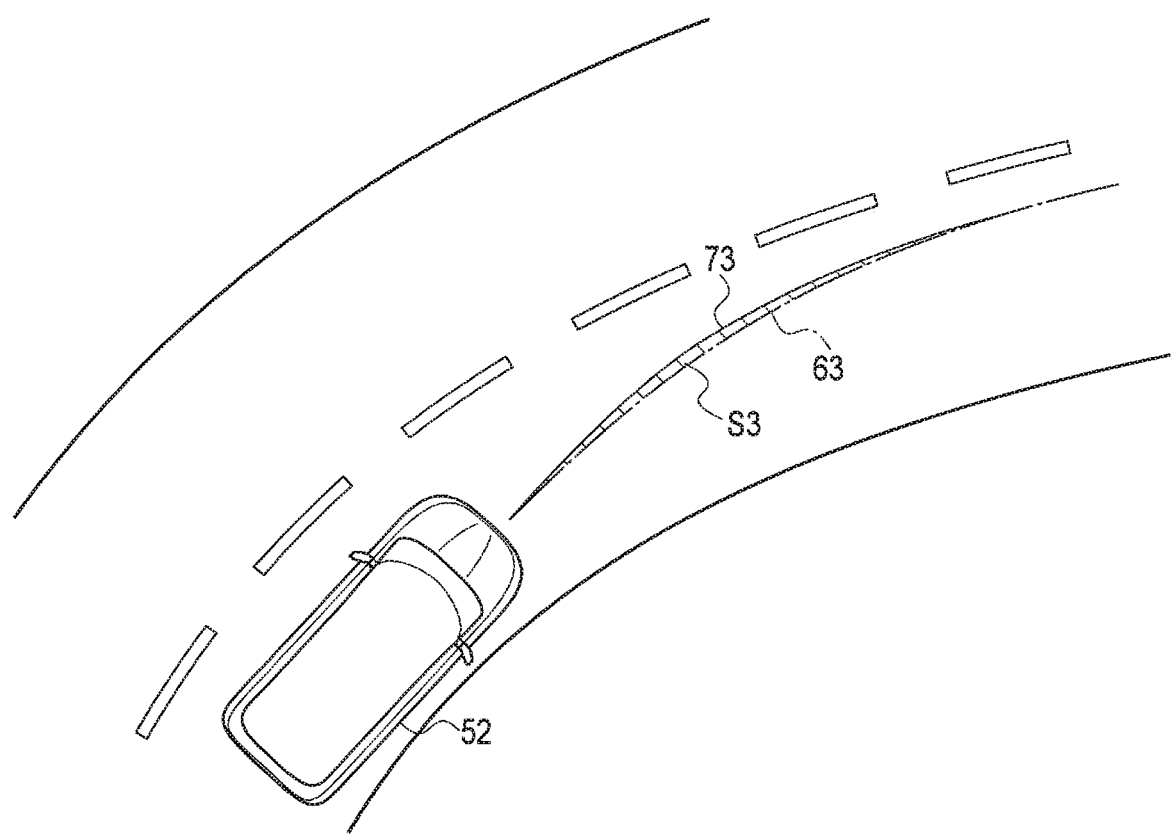
FIG. 9 is an enlarged plan view of a part in front of the parallel-traveling vehicle 52 shown in FIG. 6, showing a difference between the primary course (the obstacle-avoiding course 63) and an effective course 73.

The attitude (yaw angle) of the parallel-traveling vehicle 52 illustrated in FIG. 7 to FIG. 9 inclines to the left from the primary course 61 of the parallel-traveling vehicle 52 following the traveling lane. The velocity of the other vehicle 52 only has a component in the traveling direction, and the velocity component in the vehicle width direction is zero. The parallel-traveling vehicle 52 is thus in the state of traveling forward. When the parallel-traveling vehicle 52 is traveling in accordance with the intention of action of following the traveling lane on the basis of the above attitude and velocity, the parallel-traveling vehicle 52 travels along an effective course 71 which starts leaving the primary course 61 toward the left and then returns to finally conform to the primary course 61. In other words, the parallel-traveling vehicle 52 is presumed to follow a corrected course (overshoot course) generated such that the deviation from the traveling lane is corrected. The course prediction unit 16 thus predicts the effective course 71 conforming to the intention of action of following the traveling lane on the basis of the attitude (yaw angle) and the velocity of the parallel-traveling vehicle 52.

When the parallel-traveling vehicle 52 is traveling in accordance with the intention of action of changing the lanes on the basis of the same attitude and velocity, the parallel-traveling vehicle 52 travels along an effective course 72 which starts turning in the left direction to be shifted to the left lane, and then makes a slight turn toward the right to correct the direction so as to follow the left lane, as illustrated in FIG. 8. Namely, the effective course 72 generated includes a left-turn clothoid curve starting from a state in which the steering angle is in a neutral position and a right-turn clothoid curve. The effective course 72 is thus used for the lane change which takes more time than the "predetermined period of lane-change time" used for the calculation of the lane-change course 62. The curves used when the effective course is generated are not necessarily the clothoid curves, and may be any other curves.

When the other vehicle 52 is traveling in accordance with the intention of action of avoiding an obstacle on the basis of the same attitude and velocity, the other vehicle 52 travels along an effective course 73 which shifts from the middle of the lane toward the left first, as illustrated in FIG. 9, and then returns to the original position in the right lane after passing by the obstacle (the parked vehicle 53) (not shown). The effective course 73 is substantially the same as the primary course 63 for avoiding an obstacle, as illustrated in FIG. 9.

Although this case takes account of the attitude and the velocity as the behavior of the parallel-traveling vehicle 52, the position, the acceleration, and the deceleration of the parallel-traveling vehicle 52 may be calculated instead. For example, the deceleration upon the obstacle avoidance can be presumed to be greater than the case of the forward movement and the lane change.

The likelihood ratio estimation unit 17 compares each probability of action predicted by the action probability prediction unit 12, the first action-probability correction unit 13, and the second action-probability correction unit 15 with the behavior of the other vehicle integrated by the detection integration unit 2a, so as to predict the action of the other vehicle.

In particular, the likelihood ratio estimation unit 17 compares the primary course with the effective course for each of the probabilities of action predicted by the action probability prediction unit 12, the first action-probability correction unit 13, and the second action-probability correction unit 15. The likelihood ratio estimation unit 17 then calculates a likelihood ratio of the respective probabilities of action based on the difference between the primary course and the effective course. The likelihood ratio calculated is higher as the difference between the primary course and the effective course is smaller. The probability of action with the highest likelihood ratio can be determined to be the most reasonable when the behavior of the parallel-traveling vehicle 52 is taken into consideration. The likelihood ratio estimation unit 17 then determines that the probability of action estimated to have the highest likelihood ratio is the action that the parallel-traveling vehicle 52 takes. The difference between the primary course and the effective course is computed according to the sum of differences between the positions of the respective courses or the profiles of the velocities, for example. FIG. 7 to FIG. 9 illustrate the areas S1 to S3 each being a sum obtained by the integration of positional differences between the primary course and the effective course. The positional difference can be determined to be smaller as the area is smaller, so that a higher likelihood ratio is obtained. As another example, when the positional differences are small, but the profiles of the velocities greatly differ, a smaller likelihood ratio is obtained. The likelihood ratio is an example of an index indicating the possibility that the probability of action results in being true, and any other indication may be used instead of the likelihood ratio.

As described above, the action prediction unit 10 predicts the action of the other vehicle causing the blind spot area 54 around the host vehicle 51, in accordance with the likelihood ratio of the respective probabilities of action estimated by the likelihood ratio estimation unit 17. The term "action of the other vehicle" encompasses the course and the profile of the velocity of the other vehicle. The course of the other vehicle 52 refers to the profiles of the positions of the other vehicle 52 at different times.

The host-vehicle route generation unit 21 generates a route of the host vehicle 51 based on the action of the other vehicle predicted by the action prediction unit 10. When the action of obstacle avoidance is predicted, the route can be generated on the presumption that an obstacle is present. The host-vehicle route generation unit 21 thus can generate the route that the host vehicle 51 can follow smoothly while avoiding overlapping with the other vehicle and avoiding sudden deceleration or quick steering required in response to the behavior of the other vehicle. The term "route of the host vehicle 51" encompasses profiles of positions of the host vehicle 51 at different times and also profiles of velocities of the host vehicle 51 at the respective positions.

This embodiment predicts the action of the other vehicle including the course of the other vehicle according to the behavior of the other vehicle on the map. The generation of the route of the host vehicle 51 is thus to be based on a change in relative distance to the other vehicle causing the blind spot area 54, acceleration or deceleration, or a difference in attitude angle. For example, when the relative distance to the other vehicle causing the blind spot area 54 increases, when the difference in attitude angle between the host vehicle 51 and the other vehicle increases, or when the acceleration or deceleration of the other vehicle varies, the likelihood ratio of the probability of action of the lane change or the obstacle avoidance increases. The host-vehicle route generation unit 21 thus generates the route of the host vehicle 51 depending on the probability of action of the lane change or the obstacle avoidance. The host-vehicle route generation unit 21 may generate the route of the host vehicle 51 such that the relative distance of the host vehicle 51 to the other vehicle increases.

In the traveling situation illustrated in FIG. 6, when the speed of the parallel-traveling vehicle 51 is slow or the deceleration of the parallel-traveling vehicle 51 is large, and the degree of deviation toward the left from the middle of the traveling lane of the parallel-traveling vehicle 52 is small, the behavior of the parallel-traveling vehicle 52 is presumed to indicate the intention of action that the parallel-traveling vehicle 52 wants to give way to the host vehicle 51 so as to let the host vehicle 51 pass by and go ahead. The host-vehicle route generation unit 21 can generate the route of the host vehicle 51 or control the host vehicle 51 in view of such an intention of action to lead the host vehicle 51 to keep traveling without deceleration, so as to avoid overlapping with the other vehicle 52. The host-vehicle route generation unit 21 thus can immediately generate the route that the host vehicle 51 can follow more safely while avoiding quick steering or sudden deceleration in response to the movement of the parallel-traveling vehicle 52 causing the blind spot area, so as to control the host vehicle 51 more safely.

The vehicle controller 22 drives at least one of a steering actuator, an acceleration pedal actuator, and a deceleration pedal actuator in accordance with its position calculated by the position-in-map calculation unit 5 so that the host vehicle 51 travels to follow the route generated by the host-vehicle route generation unit 21. While the embodiment is illustrated with the case in which the host vehicle 51 is controlled in accordance with the generated route, the host vehicle 51 may be controlled regardless of the generation of the route of the host vehicle 51. In such a case, the host vehicle 51 can be controlled according to the relative distance to the other vehicle or a difference in the attitude angle between the other vehicle and the host vehicle 51.

Alternatively, the behavior of the other vehicle may be compared with the probability of action, so as to predict the conditions of the blind spot area 54 instead of the action of the other vehicle. An example of the conditions in the blind spot area 54 may include the presence of a bicycle or a pedestrian, other than the parked vehicle 53. When a pedestrian or a bicycle is presumed to be present, the behavior of the other vehicle differs from the case of the presence of the parking vehicle 53. For example, when a pedestrian or a bicycle is presumed to be present, the behavior of the other vehicle changes such that the speed of the other vehicle decreases, the deceleration increases, or the course generated upon the avoidance behavior changes. The comparison between the behavior of the other vehicle and the probability of action can predict the conditions of the blind spot area 54.

Figure 10:
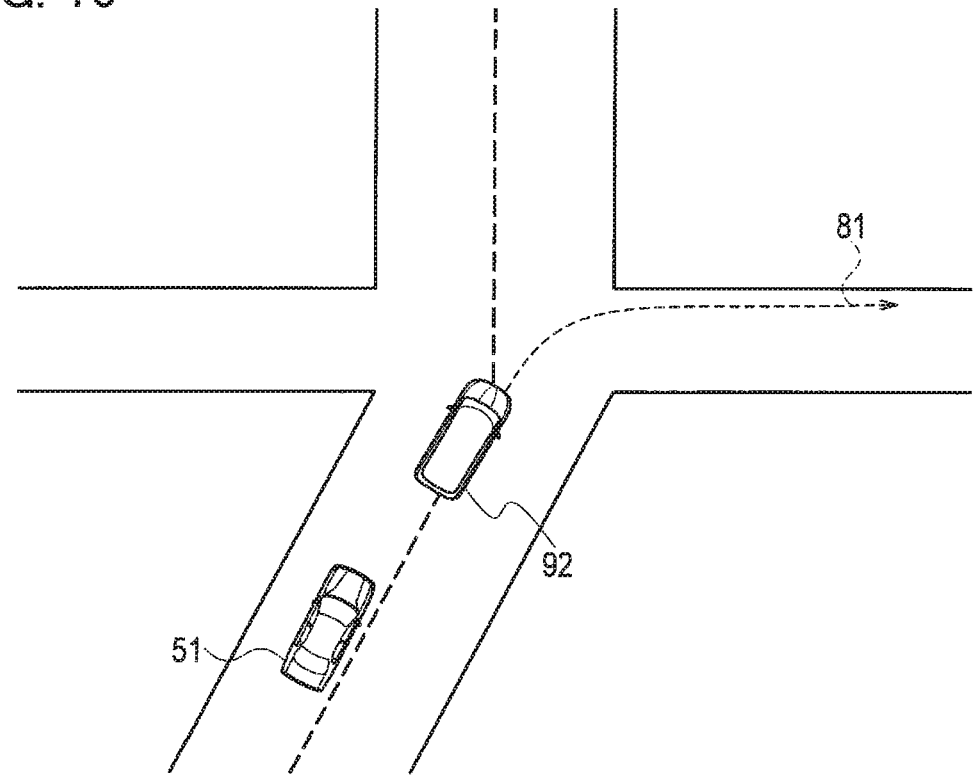
FIG. 10 is a plan view illustrating a right-turn course 81 as an example of a primary course in a traveling situation in which the host vehicle 51 is traveling parallel to a parallel-traveling vehicle 92 toward an intersection.
Figure 11:
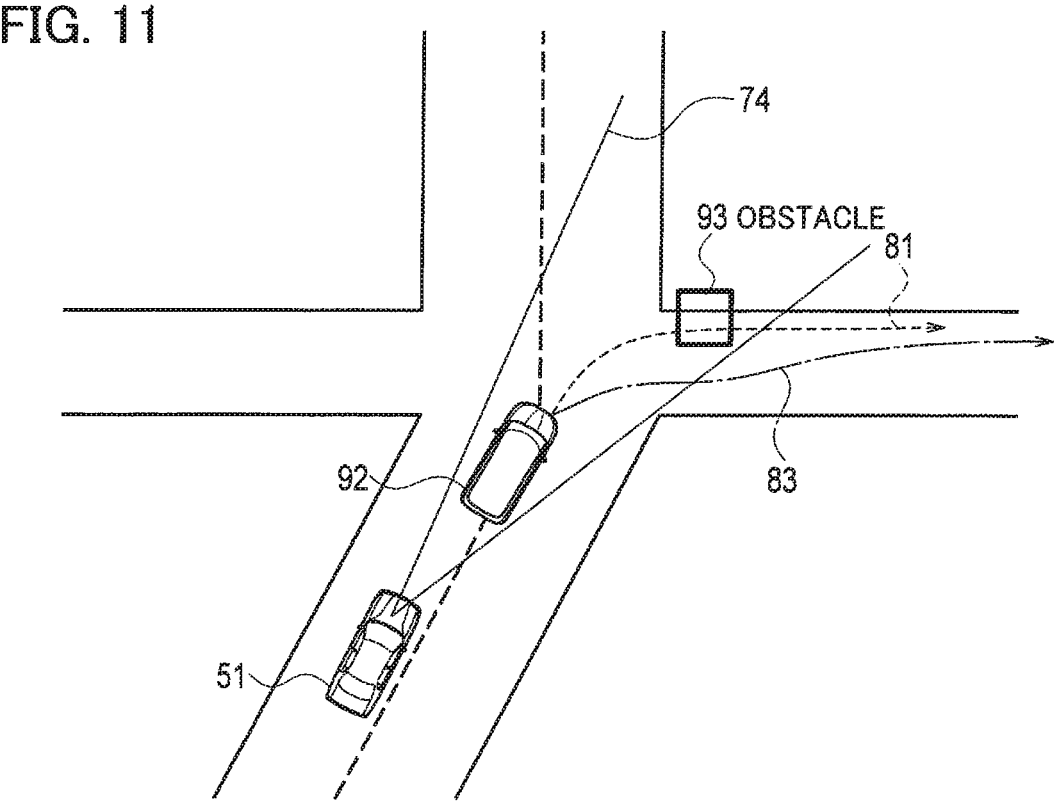
FIG. 11 is a plan view illustrating an obstacle-avoiding course 83 as another example of the primary course in the same traveling situation as illustrated in FIG. 10

Next, the operation of the driving assistance device in a traveling situation in which the host vehicle 51 is traveling parallel to a parallel-traveling vehicle 92 toward an intersection, is described below with reference to FIG. 10 and FIG. 11. The action probability prediction unit 12 predicts the intention of action including a forward movement, a right turn, and a left turn of the parallel-traveling vehicle 92 based on the road structure at the intersection, and calculates, as the primary course, a forward-movement course, a right-turn course, and a left-turn course based on the road structure at the intersection. FIG. 10 illustrates a right-turn course 81 of the parallel-traveling vehicle 92 as the primary course. FIG. 11 illustrates the same situation as that illustrated in FIG. 10. As illustrated in FIG. 11, a blind spot area 74 of the host vehicle 51 is caused by the parallel-traveling vehicle 92. While the parallel-traveling vehicle 92 is aware of an obstacle 93 in the blind spot area 74, the host vehicle 51 fails to recognize the presence of the obstacle 93, which hinders the object detection sensor mounted on the host vehicle 51 from detecting the obstacle 93.

The second action-probability correction unit 15 thus presumes that the obstacle 93 is present in the blind spot area 74. The second action-probability correction unit 15 predicts the intention of action (obstacle avoidance) that the parallel-traveling vehicle 92 would take for avoiding overlapping with the obstacle 93 on the above presumption, and calculates the primary course (obstacle-avoiding course 83) based on the predicted intention of action (obstacle avoidance). The primary course (obstacle-avoiding course 83) is added to the primary course 81 having been already calculated. As illustrated in FIG. 11, the right-turn course 81 and the obstacle-avoiding course 83 extend in different directions from the current position of the parallel-traveling vehicle 92. The course prediction unit 16 calculates the effective course per intention of action (right turn and obstacle avoidance) while taking account of the behavior (the attitude and the velocity) of the parallel-traveling vehicle 92. The likelihood ratio estimation unit 17 compares the respective primary courses (81 and 83) with the corresponding effective course for each of the probabilities of action (forward movement and obstacle avoidance), so as to predict the action of the parallel-traveling vehicle 92.

A driving assistance method according to the embodiment is described below with reference to FIG. 2 and FIG. 3. First, in step S01, the object detection device 1 detects behavior of an object around the host vehicle 51 by the respective object detection sensors. The process proceeds to step S02, and the detection integration unit 2a integrates a plurality of detection results obtained by the plural object detection sensors, and outputs a single detection result per object. The object tracking unit 2b tracks each object detected and integrated.

The process proceeds to step S03, and the host-vehicle position estimation device 3 measures the position, the attitude, and the velocity of the host vehicle 51 on the basis of a predetermined reference point by use of the position detection sensor. The process proceeds to step S04, and the map acquisition device 4 acquires the map information indicating the structure of the road on which the host vehicle 51 is traveling.

The process proceeds to step S05, and the position-in-map calculation unit 5 estimates the position and the attitude of the host vehicle 51 on the map according to the position of the host vehicle 51 measured in step S03 and the map data acquired in the step S04. The process proceeds to step S06, and the action prediction unit 10 predicts the action of the other vehicle around the host vehicle 51 in accordance with the detection result (the behavior of the other vehicle) obtained in step S02 and the position of the host vehicle specified in step S05.

The process in step S06 is described in more detail below with reference to FIG. 3. In step S611, the behavior determination unit 11 determines the road and the lane on which the other vehicle is traveling according to the position of the host vehicle 51 on the map and the behavior of the object acquired in step S02. The process proceeds to step S612, and the action probability prediction unit 12 predicts the probability of action of the other vehicle based on the map. For example, the action probability prediction unit 12 predicts the intention of action (forward movement or lane change) according to the road structure, and calculates the forward-movement course 61 or the lane-change course 62, as illustrated in FIG. 5.

The process proceeds to step S613, and the microcomputer 100 executes the process in steps S611 and S612 for all of the other vehicles detected in step S01. After the process is executed (YES in step S613), the process proceeds to step S614, and the first action-probability correction unit 13 takes account of a stationary object simultaneously detected in step S01 to correct the probability of action predicted in step S612. For example, the first action-probability correction unit 13 adds a primary course for avoiding the stationary object.

The process proceeds to step S615, and when another moving object is detected in step S01 simultaneously with the parallel-traveling vehicle 52 illustrated in FIG. 5, the first action-probability correction unit 13 takes account of the other moving object to correct the probability of action predicted in step S612.

The process proceeds to step S616, and the blind spot area detection unit 14 determines whether a blind spot area of the host vehicle 51 is caused by any object detected in step S01. When the blind spot area is caused (YES in step S616), the process proceeds to step S617, and the second action-probability correction unit 15 takes account of the blind spot area to correct the probability of action predicted by the action probability prediction unit 12. In particular, as illustrated in FIG. 6, the second action-probability correction unit 15 presumes that there is an obstacle, such as a vehicle parked on a street (parked vehicle 53) in the blind spot area 54, which requires the parallel-traveling vehicle 52 to make a change in traveling. The second action-probability correction unit 15 then predicts the intention of action that the parallel-traveling vehicle 52 causing the blind spot area 54 would take for avoiding the parked vehicle 53 in the blind spot area 54 on the above presumption, and calculates a primary course (obstacle-avoiding course 63) of the parallel-traveling vehicle 52 in accordance with the above intention of action based on the road structure. The process then proceeds to step S618.

When the blind spot area is not caused (NO in step S616), the process proceeds to step S618. The microcomputer 100 executes the process from steps S614 to S617 for all of the other vehicles detected in step S01. After the process is executed (YES in step S618), the process proceeds to step S619, and the course prediction unit 16 calculates the effective course (71 to 73) of each of the detected other vehicles when the corresponding other vehicle keeps its behavior and is presumed to take action based on the intention of action predicted, by a conventional state estimation method such as Kalman filtering.

The process proceeds to step S620, and the likelihood ratio estimation unit 17 compares the primary course (61 to 63) with the effective course (71 to 73) for each of the probabilities of action predicted in steps S612, S614, S615, and S617. The likelihood ratio estimation unit 17 then calculates a likelihood ratio of the respective probabilities of action based on the difference between the primary course and the effective course. The likelihood ratio estimation unit 17 predicts the action of the other vehicle causing the blind spot area 54 around the host vehicle 51, in accordance with the likelihood ratio of the respective probabilities of action.

The process proceeds to step S621, and the microcomputer 100 executes the process from steps S619 to S620 for all of the other vehicles detected in step S01. The specific process in step S06 shown in FIG. 2 thus ends.

Figure 2:
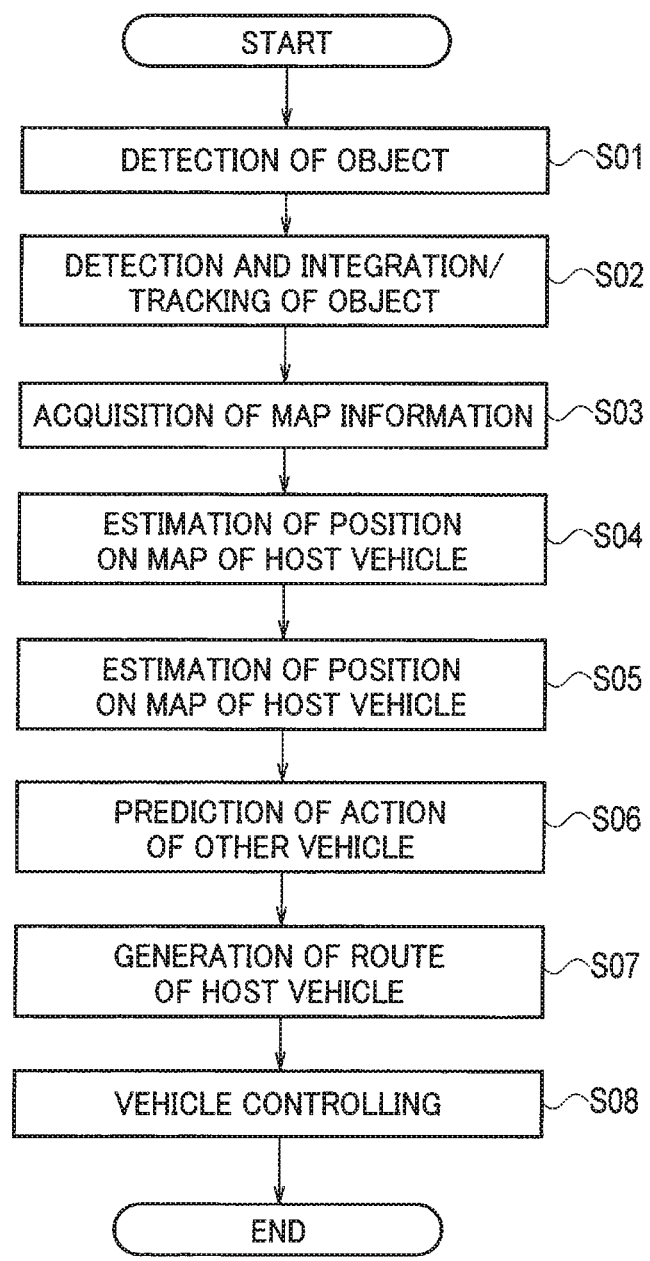
FIG. 2 is a flowchart showing an example of an operation of the driving assistance device shown in FIG. 1.
Figure 3:
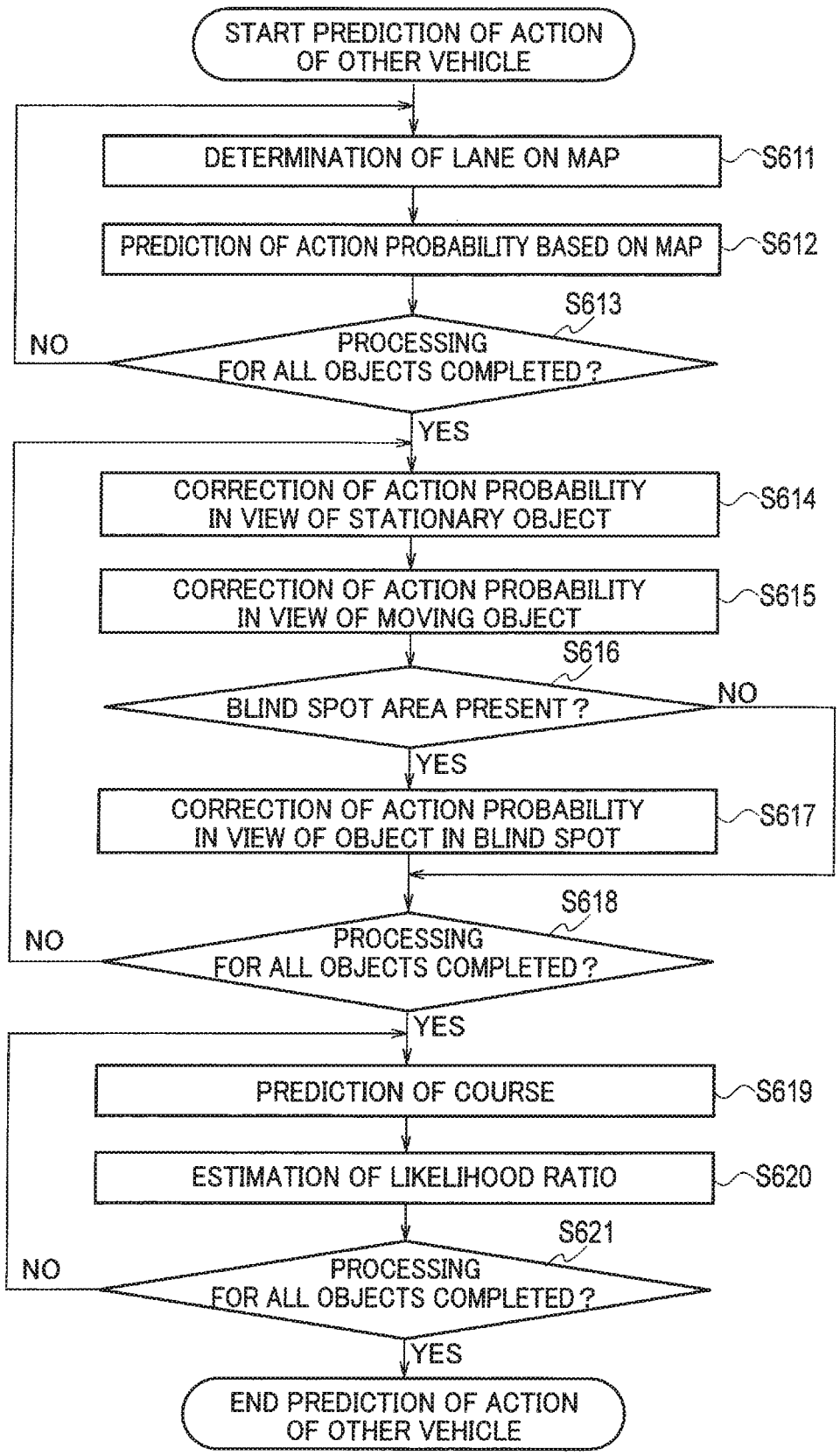
FIG. 3 is a flowchart showing a specific process in step S06 shown in FIG. 2.

The process proceeds to step S07 shown in FIG. 2, and the host-vehicle route generation unit 21 generates a route of the host vehicle 51 based on the action of the corresponding other vehicle predicted in step S06. The process proceeds to step S08, and the vehicle controller 22 controls the host vehicle 51 so as to lead the host vehicle 51 to travel following the route generated in step S07.

As described above, the embodiment can achieve the following effects.

The probability of action that the moving object (the parallel-traveling vehicle 52 or 92) would take is compared with the actual behavior of the parallel-traveling vehicle 52 or 92 when the obstacle 93 or the parked vehicle 53 is present in the blind spot area 54, so as to predict the action of the parallel-traveling vehicle 52 or 92. The action of the parallel-traveling vehicle 52 or 92 can be predicted on the presumption that the obstacle 93 or the parked vehicle 53 is present in the blind spot area 54 so as to control the host vehicle 51 on the above presumption. Since the host vehicle 51 can take initial action more immediately when the obstacle 93 such as the parked vehicle 53 is actually present in the blind spot area 54, a sudden change in behavior of the host vehicle 51 can be avoided, preventing the occupant from feeling uncomfortable. According to the embodiment, since the action of the parallel-traveling vehicle 52 or 92 can be predicted on the presumption that the obstacle 93 or the parked vehicle 53 is present in the blind spot area 54, the host vehicle 51 can take initial action more immediately than the case in which the presence of the obstacle 93 is not presumed. The embodiment can accurately predict the action of the moving object (the parallel-traveling vehicle 52 or 92) so as to determine whether the moving object is either changing lanes or taking an avoiding action, for example, to assist the host vehicle in traveling more appropriately than the case in which the action of the moving object is not predicted. The application of the embodiment can deal with a conventional problem of a vehicle which executes autonomous driving control without any instruction by a driver, but would not be able to continue the autonomous driving control for the reason that an action of a moving object (the parallel-traveling vehicle 52 or 92) cannot be predicted accurately. When the obstacle 93 such as the parked vehicle 53 is actually present in the blind spot area 54, the moving object is presumed to start decelerating in front of the obstacle 93 and then change lanes or take an action for avoiding the obstacle. The embodiment then predicts the decelerating action as the probability of action that the moving object would take in response to the presence of the parked vehicle 53. Namely, the embodiment can predict that the other vehicle would change lanes or take an action for avoiding the obstacle before the other vehicle takes either action, when the deceleration of the moving object is actually detected. The host vehicle 51 thus can take initial action more immediately, so as to avoid a sudden change in behavior of the host vehicle 51 to prevent the occupant from feeling uncomfortable.

The driving assistance device generates a route of the host vehicle based on the predicted action of the parallel-traveling vehicle 52 or 92, and controls the host vehicle 51 in accordance with the route of the host vehicle 51. The driving assistance device thus can generate a safer route for the host vehicle 51 so as to avoid a risk, according to the action of the parallel-traveling vehicle 52 or 92.

The driving assistance device predicts the course of the parallel-traveling vehicle 52 or 92 by comparing the behavior of the parallel-traveling vehicle 52 or 92 with the probability of action that the parallel-traveling vehicle 52 or 92 would take. The driving assistance device thus can control the host vehicle 51 in accordance with the course of the parallel-traveling vehicle 52 or 92, so as to avoid a sudden change in behavior of the host vehicle 51 to prevent the occupant from feeling uncomfortable.

The driving assistance device may detect a relative distance of the parallel-traveling vehicle 52 or 92 to the host vehicle 51 so as to generate a route of the host vehicle 51 in accordance with a change in the relative distance. The driving assistance device thus can lead the host vehicle 51 to take a prompt and smooth behavior upon the change in the relative distance.

The driving assistance device may detect, as the change in the relative distance of the parallel-traveling vehicle 52 or 92 to the host vehicle 51, the acceleration or the deceleration of the parallel-traveling vehicle 52 or 92 so as to generate a route of the host vehicle 51 in accordance with the acceleration or the deceleration. Taking account of the acceleration or the deceleration can lead the host vehicle 51 to take a prompt and smooth behavior upon a sudden change in the acceleration or the deceleration.

The driving assistance device may detect a difference in the attitude angle between the parallel-traveling vehicle 52 or 92 and the host vehicle 51 so as to generate a route of the host vehicle 51 in accordance with the difference in the attitude angle. The driving assistance device thus can lead the host vehicle 51 to take prompt and smooth behavior upon the change in the attitude angle.

The driving assistance device generates a route of the host vehicle 51 such that the relative distance of the parallel-traveling vehicle 52 or 92 to the host vehicle 51 increases. The driving assistance device thus can lead the host vehicle 51 to take prompt and smooth behavior upon the change in the behavior of the parallel-traveling vehicle 52 or 92.

The driving assistance device may compare the behavior of the parallel-traveling vehicle 52 or 92 with the probability of action that the parallel-traveling vehicle 52 or 92 would take, so as to estimate the conditions in the blind spot area 54 to predict the action of the moving object according to the conditions in the blind spot area 54. Since the action of the parallel-traveling vehicle 52 or 92 can be predicted in accordance with the estimated conditions in the blind spot area 54, the host vehicle 51 can be controlled depending on the prediction of the behavior of the parallel-traveling vehicle 52 or 92 based on the conditions of the blind spot area 54, so as to avoid a sudden change in behavior of the host vehicle 51 to prevent the occupant from feeling uncomfortable.

The primary course (61 to 63) predicted depending on the intention of action based on the road structure is compared with the effective course (71 to 73) that the parallel-traveling vehicle 52 or 92 is presumed to follow according to the intention of action when the parallel-traveling vehicle 52 or 92 keeps its behavior, so as to determine a likelihood ratio of each probability of action (in step S620). This can determine the reasonableness of each probability of action accurately in accordance with the behavior of the parallel-traveling vehicle 52 or 92. The host vehicle 51 thus can take appropriate initial action in accordance with the behavior of the parallel-traveling vehicle 52 or 92.

The driving assistance device compares the behavior of the parallel-traveling vehicle 52 or 92 with the probability of action that the parallel-traveling vehicle 52 or 92 would take, so as to control the host vehicle in accordance with the probability of action of the parallel-traveling vehicle 52 or 92 when the behavior of the parallel-traveling vehicle 52 or 92 is similar to the probability of action. The host vehicle 51 thus can take appropriate initial action based on the presence of the obstacle 93 such as the parked vehicle 53, when actually present in the blind spot area 54, so as to avoid a sudden change in behavior of the host vehicle 51 to prevent the occupant from feeling uncomfortable.

The driving assistance device compares the behavior of the parallel-traveling vehicle 52 or 92 with the probability of action that the parallel-traveling vehicle 52 or 92 would take, so as to control the host vehicle in accordance with the behavior of the parallel-traveling vehicle 52 or 92 when the behavior of the parallel-traveling vehicle 52 or 92 is not similar to the probability of action. The host vehicle 51 thus can take appropriate initial action based on the actual behavior of the parallel-traveling vehicle 52 or 92 regardless of what the blind spot area 54 is caused, so as to avoid a sudden change in behavior of the host vehicle 51 to prevent the occupant from feeling uncomfortable.

While the present invention has been described above by reference to the embodiment, it should be understood that the present invention is not intended to be limited to the above descriptions, and various alternatives and modifications will be apparent to those skilled in the art.

While the above embodiment has been illustrated with the case in which the host vehicle 51 is an autonomous driving vehicle, the host vehicle 51 may be a manual driving vehicle. In such a case, the host vehicle 51 can include, instead of the vehicle controller 22, a controller for controlling a speaker, a display, and a user interface thereof for guiding the driver in operating the steering wheel, the accelerator, and the brake by use of voice or images.

REFERENCE SIGNS LIST

51 HOST VEHICLE
52, 92 PARALLEL-TRAVELING VEHICLE (MOVING OBJECT)
53, 93 PARKED VEHICLE (OBSTACLE)
54, 74 BLIND SPOT AREA
61 to 63, 81, 83 PRIMARY COURSE
71 to 73 EFFECTIVE COURSE
S1 to S3 DIFFERENCE BETWEEN EFFECTIVE COURSE AND PRIMARY COURSE

The invention claimed is:

1. A driving assistance method for predicting an action of a moving object around a host vehicle to control the host vehicle according to the predicted action of the moving object, the method comprising:
   detecting a behavior of the moving object causing a blind spot area around the host vehicle;
   predicting a probability of action that the moving object takes when an obstacle which cannot be detected by the host vehicle is present in the blind spot area, according to a road structure around the host vehicle; and
   comparing the behavior with the probability of action so as to predict the action of the moving object.

2. The driving assistance method according to claim 1, further comprising:
   generating a route of the host vehicle based on the predicted action of the moving object; and
   controlling the host vehicle in accordance with the route of the host vehicle.

3. The driving assistance method according to claim 1, further comprising:
   comparing the behavior with the probability of action so as to predict a course of the moving object.

4. The driving assistance method according to claim 2, further comprising:
   detecting a change in relative distance of the moving object to the host vehicle; and
   generating the route of the host vehicle based on the change in the relative distance.

5. The driving assistance method according to claim 4, further comprising:
   detecting acceleration or deceleration of the moving object as the change in the relative distance; and
   generating the route of the host vehicle based on the acceleration or the deceleration.

6. The driving assistance method according to claim 2, further comprising:
   detecting a difference in attitude angle between the moving object and the host vehicle; and
   generating the route of the host vehicle based on the difference in the attitude angle.

7. The driving assistance method according to claim 2, further comprising generating the route of the host vehicle such that a relative distance of the moving object to the host vehicle increases.

8. The driving assistance method according to claim 1, further comprising:
   comparing the behavior with the probability of action so as to predict a condition in the blind spot area; and
   predicting the action of the moving object according to the condition in the blind spot area.

9. The driving assistance method according to claim 1 further comprising:
   predicting an effective course that the moving object takes when the moving object keeps the behavior and the obstacle which cannot be detected by the host vehicle is present in the blind spot area;
   predicting a primary course that the moving object takes when the obstacle which cannot be detected by the host vehicle is present in the blind spot area, according to the road structure around the host vehicle;
   evaluating a likelihood ratio of the primary course in accordance with a difference between the effective course and the primary course; and
   predicting the action of the moving object in accordance with the likelihood ratio.

10. The driving assistance method according to claim 1, further comprising controlling the host vehicle in accordance with the probability of action when the behavior and the probability of action are similar to each other.

11. The driving assistance method according to claim 1, further comprising controlling the host vehicle in accordance with the behavior when the behavior is not similar to the probability of action.

12. A driving assistance device comprising:
   an object detection sensor configured to detect a behavior of a moving object causing a blind spot area around a host vehicle; and
   a controller configured to predict an action of the moving object and control the host vehicle according to the predicted action of the moving object,
   wherein the controller predicts a probability of action that the moving object takes when an obstacle which cannot be detected by the host vehicle is present in the blind spot area, according to a road structure around the host vehicle, and
   the controller compares the behavior with the probability of action so as to predict the action of the moving object.

* * * * *